Jan. 16, 1951   E. HENKEL   2,538,195
FLUID SEPARATOR
Filed April 10, 1945
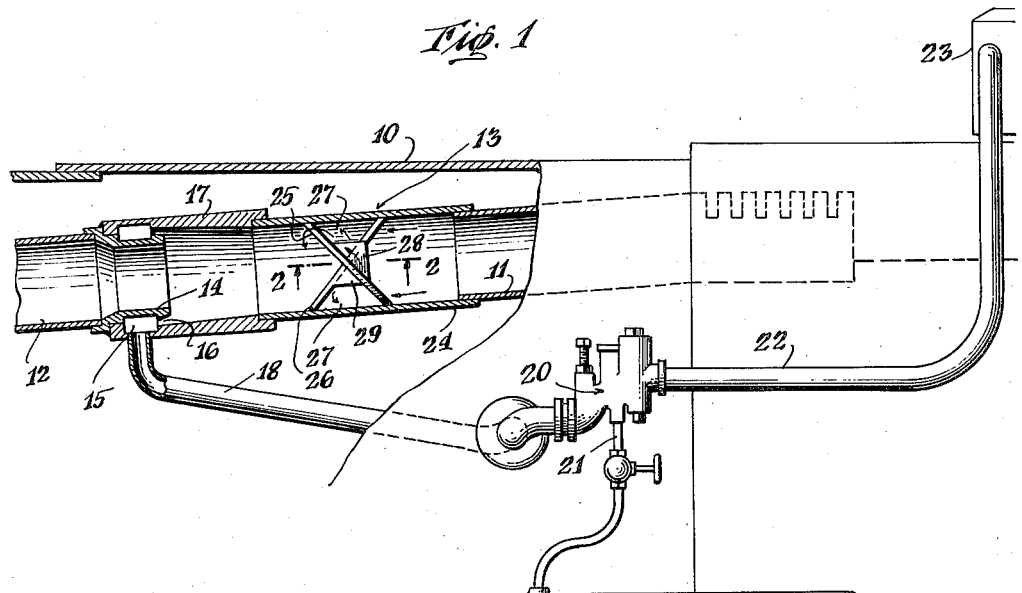
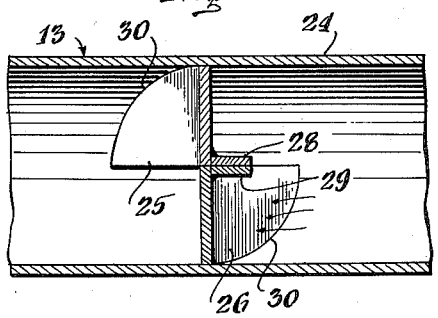
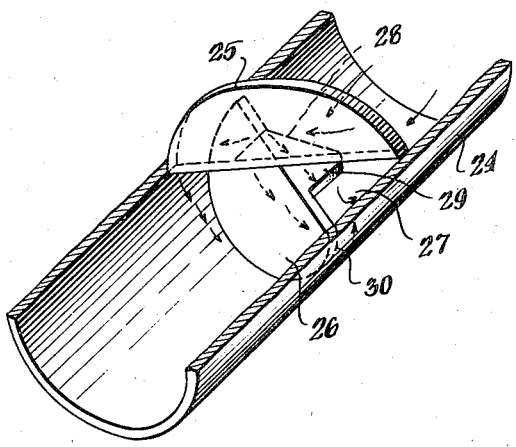
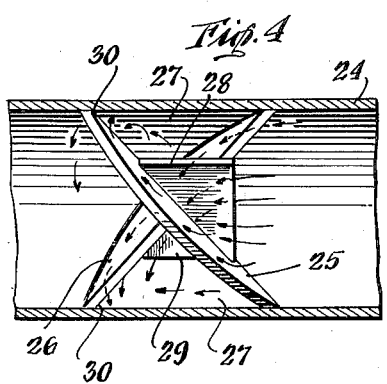
INVENTOR
Erich Henkel
BY
ATTORNEY Patented Jan. 16, 1951

2,538,195

UNITED STATES PATENT OFFICE 2,538,195

FLUID SEPARATOR

Erich Henkel, Calumet City, Ill., assignor to Combustion Engineering-Superheater, Inc., a corporation of Delaware Application April 10, 1945, Serial No. 587,503

1 Claim. (Cl. 183—80)

The present invention relates to fluid separators and particularly to one especially adapted for use to separate water from steam in a fire tube boiler as utilized in locomotives.

A common form of separator used in various forms of boilers functions on the centrifugal principle and is provided with a helix mounted in a conduit through which the mixture of steam and water flows to impart a centrifugal motion to cause the water to be thrown out into a bowl or collecting chamber while the steam passes on into an outlet pipe. When a particle of water in steam is given such a whirling motion the force on the particle is equal to the centrifugal force on the particle of water minus the centrifugal force on the volume of steam displaced. As a result, with steam and water both revolving at the same velocity the greater density of the water particle gives it a force in an outward direction. If the particle of water is moving at a velocity considerably slower than that of the steam it is possible for the net force on the particle to be in an inward direction. Consequently, the helix type of separator frequently fails to effect an efficient separation of water from the steam.

An object of the present invention is to provide a steam and water separator which is more efficient than those heretofore provided. The invention will be best understood upon consideration of the following detailed description of an illustrative embodiment thereof when read in conjunction with the accompanying drawings in which:

Figure 1 is a fragmentary view of part of a locomotive boiler showing a steam and water separator embodying the present invention in longitudinal section.

Figure 2 is a sectional view on the line 2—2 in Figure 1.

Figure 3 is a perspective view of the improved separator with part of the housing thereof broken away to illustrate the internal construction and Figure 4 is a view of the internals of the separator as viewed at close range when part of the enclosing housing is removed.

In the drawings the numeral 10 designates the outer shell of a locomotive boiler having a dry pipe 12 for conducting steam to the inlet header of the superheater from which it passes under control of throttle valves in the outlet header to the engines or turbines driving the locomotive. Immediately forward of the inlet section 11 of the dry pipe 12 there is mounted the improved steam and water separator which is designated as a whole by the numeral 13. The steam passes from the separator into a nozzle 14 at the end of the dry pipe 12 while the separated water flows into a chamber 15 by way of an annular passage 16 formed between nozzle 14 and a sleeve 17 spaced from the latter. From the chamber 15 the separated water flows through a conduit 18 to a discharge valve 20. As disclosed in Williams Patent 2,368,509 issued on January 30, 1945, the valve 20 functions to continuously bleed-off through a pipe 21 the water ordinarily discharged from the separator 13 and when excessive amounts of water are to be disposed of the valve 20 functions to direct the larger amounts of water through a conduit 22 into a steam separator 23 from which the separated water is discharged to the ground.

The steam and water separator of this invention comprises a housing in the form of a pipe section or conduit 24 connecting the inlet section 11 of the dry pipe with the sleeve 17 which encloses the water chamber of the separator. Mounted within conduit 24 are a pair of baffle plates 25 and 26 which are semi-elliptical in form, and mounted at angles of approximately 90° with respect to each other and at angles of approximately 45° with respect to the longitudinal axis of the housing 24. As best seen in Figs. 3 and 4, the baffle plate 25 surmounts the baffle plate 26, the two plates being in contact along their diametrical edge portions thereof which intersect. The aggregate area of the two baffle plates 25 and 26 is greater than the cross-sectional area of the conduit 24. However, the angular relation of the baffle plates 25 and 26 with respect to each other results in providing two openings or passages 27 therebetween through which the steam may flow in directions perpendicular to the longitudinal axis of the conduit 24, that is to say, generally radially thereof. The size of the passages 27 is restricted as desired by baffle plates 28, 29 extending between and disposed normally to the baffle plates 25 and 26 at the plane of their juncture. A similar baffle plate may be provided on the upstream side between the main baffles 25 and 26; in the form shown this constitutes an extension of the baffle 28 that restricts the passage 27 at one side of the conduit.

The construction described above and embodying the invention functions quite differently, from the conventional form of separator employing a spiral baffle intended to give a whirling action to the mixture of steam and water. Considering one half of the conduit 24 including the baffle plate 26, the steam and water mixture flowing longitudinally along the pipe strikes the plate 26 and is led to its outer edge 30 where it meets the inner periphery of the conduit 24. Up to this point no centrifugal motion has been imparted to the steam and water mixture because the surfaces of the baffle plates 25 and 26 are planar or flat as distinguished from the bulged or curved surfaces presented by spirally shaped baffles. Somewhat before the outer edge 30 of the plate 26 is reached the steam passes through the opening 27, the area of which is determined by the supplementary baffle 29. The water continues to the inner periphery of the conduit and then due to the circular contour of the conduit is given a whirling motion. The steam is also given a whirling motion because the opening through which it passes is at right angles to its original direction of flow along the longitudinal axis of the conduit. In this manner the mixture is carried out from the center of the conduit to a relatively large radius before any centrifugal action occurs. Before this action takes effect the greater part of the water has been separated from the steam because of the simple change in direction in the steam flow. Consequently, the amount of water remaining to be separated by centrifugal action is relatively small and less energy is required from the steam to effect final separation by centrifugal action. Although the operation has been described for one half of the separator, it will be apparent that the other half functions in a similar manner. The water flowing along the wall of the pipe 24 will follow the wall of sleeve 17 to the annular passage 16 between this section and nozzle 14 through which the dried steam passes.

Although described herein as a steam and water separator it will be apparent that the apparatus may be utilized for separation of other fluids of different densities.

What I claim is:

In a fluid separator having a conduit through which a stream of mixed fluids flows and a chamber for receiving liquid disentrained from the stream; a pair of flat baffle plates having an aggregate area greater than that of the transverse section of the conduit and mounted in advance of said chamber in the direction of fluid flow and so disposed with edge portions in contact as to offer obstruction to fluid flow over the entire cross-sectional area of said conduit, said plates being located each in one of a pair of angularly intersecting planes both displaced from the longitudinal axis of the conduit so as to provide passages at right angles to said axis for fluid to flow between said baffles; and other baffle plates extending between and disposed normally to said first baffle plates in substantially the common plane of their diametral edge portions for reducing the area of the passages formed between and by the intersection of said first baffle plates.

ERICH HENKEL.

REFERENCES CITED

The following references are of record in the file of this patent:

UNITED STATES PATENTS

| Number | Name | Date |
|---|---|---|
| 767,721 | Swartwout | Aug. 16, 1904 |
| 1,086,211 | Playford | Feb. 3, 1914 |
| 1,282,175 | Binks | Oct. 22, 1918 |
| 1,816,871 | Remington | Aug. 4, 1931 |
| 2,186,344 | Price | Jan. 9, 1940 |
| 2,384,714 | Villiger | Sept. 11, 1945 |

FOREIGN PATENTS

| Number | Country | Date |
|---|---|---|
| 92,509 | Germany | June 26, 1897 |
| 36,917 | Netherlands | Oct. 16, 1935 |